(12) United States Patent
Adell (10) Patent No.: US 10,113,850 B1
(45) Date of Patent: Oct. 30, 2018

(54) TOOL FOR DISCLOSING AND CORRECTING DIMENSIONAL NON-COMPLIANCE OF AN EDGE PRIOR TO MOUNTING AN EDGE GUARD

(71) Applicant: Loren S. Adell, Sunnyvale, TX (US)

(72) Inventor: Loren S. Adell, Sunnyvale, TX (US)

( * ) Notice: Subject to any disclaimer, the term of this patent is extended or adjusted under 35 U.S.C. 154(b) by 168 days.

(21) Appl. No.: 15/204,047

(22) Filed: Jul. 7, 2016

(51) Int. Cl.
*G01B 3/28* (2006.01)

(52) U.S. Cl.
CPC ..................... *G01B 3/28* (2013.01)

(58) Field of Classification Search
CPC ........................................... G01B 3/28
USPC ............................. 73/1.08; 236/5
See application file for complete search history.

(56) References Cited

U.S. PATENT DOCUMENTS

| | | | | |
|---|---|---|---|---|
| 4,875,294 A * | 10/1989 | Jefferson | ............. | E05B 17/0016 33/539 |
| 5,396,704 A * | 3/1995 | Fiala | ......................... | B26B 5/00 30/165 |
| 5,784,788 A * | 7/1998 | Cothery | .................... | B26B 5/00 279/79 |
| 2014/0259438 A1* | 9/2014 | Rubin | .................... | B25F 1/006 7/163 |

* cited by examiner

*Primary Examiner* — Natalie Huls
*Assistant Examiner* — Monica S Young
(74) *Attorney, Agent, or Firm* — George L. Boller (57) ABSTRACT

A tool has a gauge for disclosing if an edge of an object has sufficient clearance depth to allow an edge guard to be properly installed on the edge and a correction tool for correcting insufficient clearance depth by displacing interfering material on the edge so that sufficient clearance depth for properly installing an edge guard on the edge is achieved.

21 Claims, 5 Drawing Sheets

TOOL FOR DISCLOSING AND CORRECTING DIMENSIONAL NON-COMPLIANCE OF AN EDGE PRIOR TO MOUNTING AN EDGE GUARD

TECHNICAL FIELD

This invention relates to a tool comprising a gauge for gauging an edge of an object in order to distinguish dimensional compliance which would allow an edge guard to be properly fitted on the edge from dimensional non-compliance which could cause an edge guard to be improperly fitted on the edge and/or create the appearance of the edge having been damaged by the edge guard installation. The tool also comprises a correction tool for correcting dimensional non-compliance caused by material which has been incorrectly applied to the edge and caused the dimensional non-compliance.

BACKGROUND

Applicant is the inventor of a number of patents relating to what are commonly referred to as edge guards. As used in automotive vehicles, edge guards are commonly mounted on the trailing edges of swinging closures such as doors, trunk lids, engine compartment hoods, and fuel fill doors, but they may also be installed on edges of other non-swinging components such as drip rails, bumper edges, etc. When mounted on doors, edge guards are commonly called door edge guards.

Edge guards not only provide protection of the edges of the components on which they are mounted, but can also serve to protect individuals from contact with raw edges.

In general it is undesirable to use separate fasteners, adhesives, and the like for mounting an edge guard on an edge because of the use of additional parts and/or materials, additional process steps in manufacturing and/or mounting an edge guard, and/or poor esthetic appearance after mounting. From the standpoints of appearance, mounting, and protection, a metallic self-retaining edge guard is superior to non-metallic ones, such as those fabricated entirely from a plastic like vinyl.

A metallic self-retaining edge guard may be painted to provide a desired color different from that of the metal. Moreover, a self-retaining edge guard need not be 100% metal, either painted or unpainted. It may comprise a thin non-metallic covering, such as vinyl, on its inside and/or its outside. Such coverings may be applied by co-extrusion processes to the metal from which an edge guard is formed. A thin non-metallic covering on the inside can provide insulation of the edge guard's metal to the edge, while such a covering on the outside may be colorized to provide a desired appearance.

SUMMARY OF THE DISCLOSURE

Applicant has observed that certain manufacturing operations may occasionally leave material on an edge which will present an interference to an edge guard which is to be installed on the edge. An example of this is the hem flange at the trailing edge of an automobile door onto which a door edge guard is to be installed. A representative hem flange comprises a trailing edge of an outer door panel being wrapped around and clinched onto a matching trailing edge of an inner door panel as will be explained later with reference to FIGS. 1-4. Because the clinching operation may not assure sealing of the two door panels to each other along their trailing edges, a sealant is applied to the inside of the hem flange along the length of the clinch. The sealant may be painted during painting of the body-in-white door. If care is not taken in applying the sealant, the sealant, when fully cured and adhered to the hem flange, may present an interference to installation of the door edge guard on the hem flange. In such a situation, the door edge guard will tend to push the interfering sealant away and consequently disrupt some of the seal during installation. As a result, design intent may not be achieved because the door edge guard does not fit properly fit to the hem flange and/or because disruption of the seal material creates what appears as a visible imperfection even if integrity of the seal is not breached. Such disruption may be more prominent when the painting of the door also paints the sealant.

The present invention provides a solution for enabling a door edge guard to be fit to a hem flange in accordance with design intent when such a situation occurs.

The disclosed embodiment of the invention comprises a gauge for dimensionally gauging an edge of an object, such as a door hem flange, before an edge guard is mounted on the edge and a correction tool for displacing material, such as sealant which has been applied and adhered to the edge, and which presents an interference which the gauge has disclosed would prevent the edge guard from being correctly fitted on the edge.

The foregoing summary, accompanied by further detail of the disclosure, will be presented in the Detailed Description below with reference to the following drawings that are part of this disclosure.

DETAILED DESCRIPTION

Figure 1:
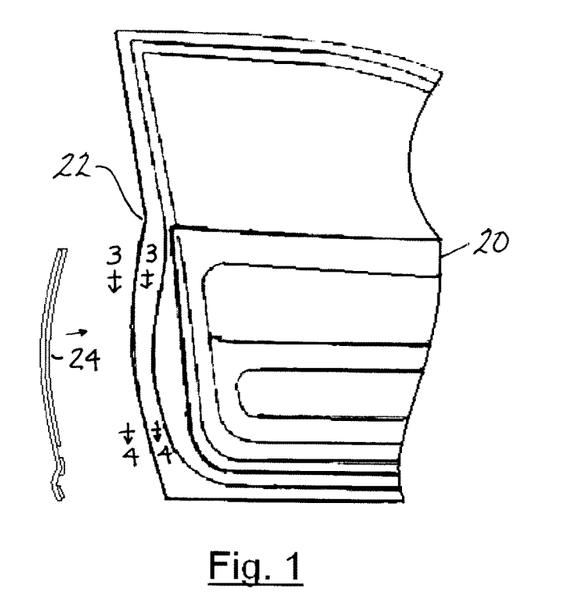
FIG. 1 is a partial side elevation view showing an inside of an automobile door and suggesting how a door edge guard is to be installed on a trailing edge of the door.
Figure 2:
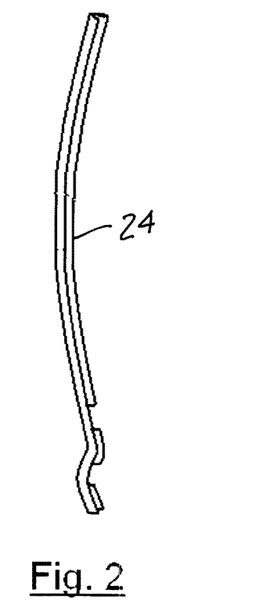
FIG. 2 is a magnified view of the door edge guard.
Figure 3:
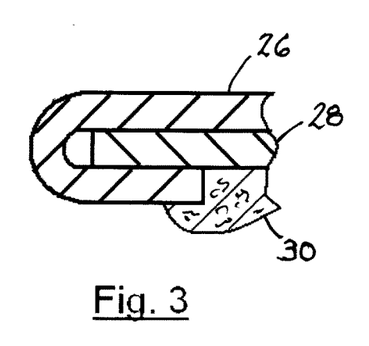
FIG. 3 is a magnified cross section view in the direction of arrows 3-3 in FIG. 1.
Figure 4:
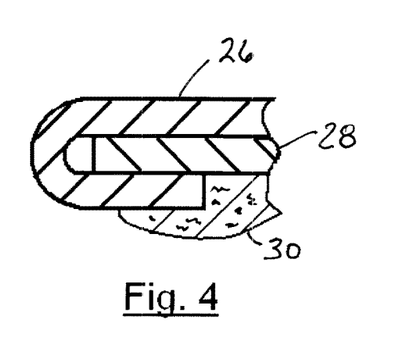
FIG. 4 is a view in the direction of arrows 4-4 in FIG. 1.

FIG. 1 shows an automobile door 20 having a trailing edge 22 whose length runs generally vertically and a self-retaining door edge guard 24 ready to be fit onto trailing edge 22. Trailing edge 22 has a lengthwise contour which is based on an automobile's styling, but in transverse cross section such as shown in FIGS. 3 and 4, comprises what is sometimes referred to as a hem flange which is created during manufacture of door 20 by wrapping a trailing edge of an outer door panel 26 around a matching trailing edge of an inner door panel 28 and clinching the wrapped-around trailing edge of outer door panel 26 onto the trailing edge of inner door panel 28. The result of that operation creates a generally U-shaped bend in outer door panel 26 which secures it to the trailing edge of inner door panel 28. Door edge guard 24 has a generally concave interior, or inside, which is shaped to expand slightly as it slides onto the hem flange to enable the door edge guard to be self-retained on the hem flange without adhesive or additional fasteners.

Because the clinching operation may not assure proper sealing of door panels 26, 28 to each other along the hem flange, a sealant 30 is applied to the inside of the hem flange along the length of the clinch as shown in FIGS. 3 and 4. Care must be taken to apply the sealant so that it doesn't intrude onto the portion of the hem flange onto which door edge guard 24 is to be fit. If care is not taken in applying the sealant, the sealant, when fully cured and adhered to the hem flange, may present an interference which prevents the door edge guard from properly fitting on the hem flange. Applicant has observed that interference may occasionally occur when the sealant is applied manually by a person rather than automatically by a programmed robot.

FIG. 3 shows sealant 30 not intruding onto the portion of the hem flange onto which door edge guard 24 is to be fit while FIG. 4 shows sealant 30 intruding onto the portion of the hem flange onto which door edge guard 24 is to be fit.

FIGS. 5-9 show a tool 32 for gauging the hem flange and for displacing sealant at any location which would interfere with installation of door edge guard 24 on the hem flange along the full length of the door edge guard. Tool 32 comprises a solid body 34 having a lengthwise intermediate portion 36 whose perimeter extends circularly around a central longitudinal axis 38 of body 34. A gauge 40 is at one lengthwise end portion of body 34 and a correction tool 42 is at the opposite lengthwise end portion.

Figures 9, 10, 11:
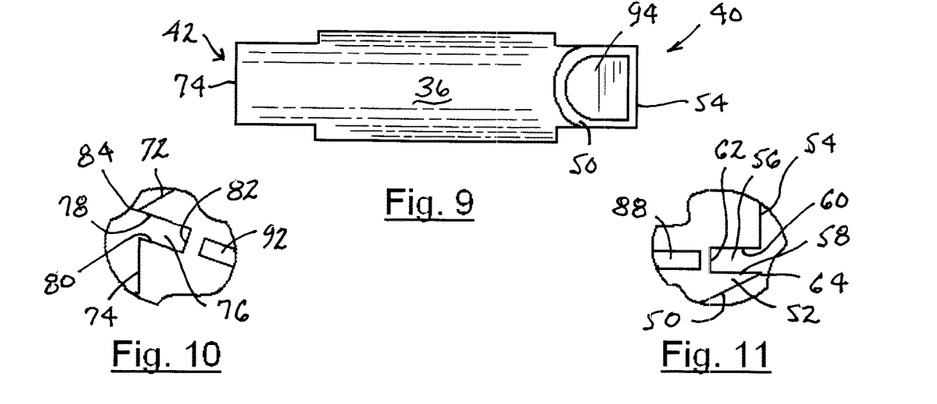
FIG. 9 is a bottom view of FIG. 5.
FIG. 10 is a magnified view of one portion of FIG. 5.
FIG. 11 is a magnified view of another portion of FIG. 5.

The shape of the one lengthwise end portion of body 34 provides gauge 40 with a perimeter which comprises a partially circular surface 44 centered on axis 38, flat parallel side surfaces 46 and 48 extending away from circumferentially opposite ends of surface 44, a flat surface 50 which is circumferentially opposite surface 44 and which lies in a plane which intersects axis 38 at an acute angle which is equal to angle 52 (marked in FIG. 11), and a flat end surface 54 which lies in a plane perpendicular to axis 38. Surface 44 is a continuation of a top portion of the circular perimeter of lengthwise intermediate portion 36, as viewed in FIGS. 5 and 7. Between surfaces 50 and 54 is an open slot 56 which, as also shown in FIG. 11, has an open entrance between surfaces 50 and 54 and mutually confronting side surfaces 58, 60 which lie in respective parallel planes and respectively extend depthwise of slot 56 axially inwardly from surfaces 50 and 54 parallel with axis 38. Slot 56 ends at a bottom surface 62 which extends between side surfaces 58, 60 in a direction perpendicular to axis 38. Surface 50 and side surface 58 which define angle 52 intersect in a sharp edge 64. Side surfaces 46, 48 are spaced apart a distance less than a diameter of intermediate portion 36, and the length of slot 56 ends at those side surfaces.

The shape of the opposite lengthwise end portion of body 34 provides correction tool 42 with a perimeter which comprises a partially circular surface 66 centered on axis 38, flat parallel side surfaces 68 and 70 extending from circumferentially opposite ends of surface 66, a flat surface 72 which is circumferentially opposite surface 66 and which lies in a plane which intersects axis 38 at an acute angle, and a flat end surface 74 which lies in a plane perpendicular to axis 38. Surface 66 is a continuation of a bottom portion of the circular perimeter of lengthwise intermediate portion 36, as viewed in FIGS. 5 and 6. Surface 44 and surface 66 are continuations of diametrically opposite portions of the circular surface of lengthwise intermediate portion 36. Between surfaces 72 and 74 is an open slot 76 which, as shown in FIG. 10, has an open entrance between surfaces 72 and 74 and mutually confronting side surfaces 78, 80 which extend depthwise of slot 76 inwardly from surfaces 72 and 74 respectively in directions which are non-parallel to axis 38 at identical acute angles to axis 38. Slot 76 ends at a bottom surface 82 which extends between side surfaces 78, 80 in a direction which is perpendicular to side surfaces 78, 80 and non-perpendicular to axis 38. Surface 72 and side surface 78 intersect in a sharp edge 84 to form a wedge. Side surfaces 68, 70 are spaced apart a distance less than a diameter of intermediate portion 36, and the length of slot 76 ends at those side surfaces.

Tool 32 is used to gauge any portion or portions of the door hem flange to assure that sealant has not intruded onto an inside surface of the hem flange along which an inner leg of the door edge guard will slide as the door edge guard is being installed on the hem flange. Consequently the depth of slot 56 defines the portion of the hem flange which should be free of sealant in order to enable the door edge guard to be properly installed without creating appearance of any imperfection as a result of the installation. The width of slot 56 between side surfaces 58 and 60 is slightly greater than the thickness of the hem flange.

Figure 12:
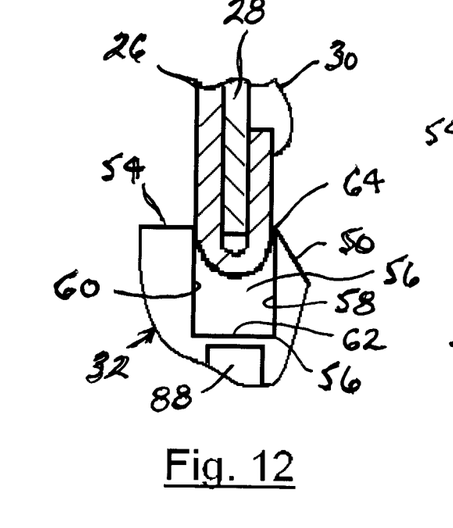
FIGS. 12 and 13 illustrate use of the tool to gauge the portion of the trailing edge of the door shown in FIG. 3.
Figure 13:
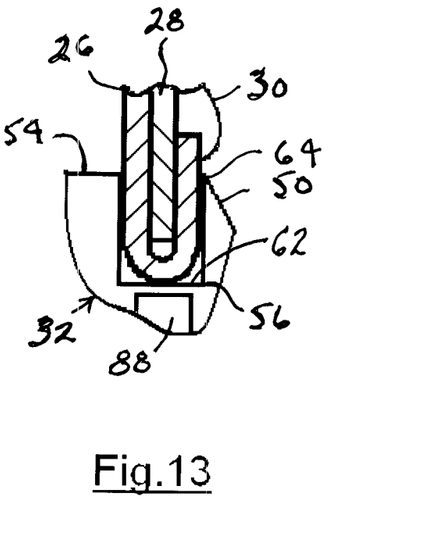

The hem flange is gauged by initially placing tool 32 to align slot 56 with the hem flange and then advancing the tool onto the hem flange to cause the hem flange to be inserted slot 56 as shown in FIG. 12. When the hem flange can be inserted to the full depth of slot 56 as shown in FIG. 13, sealant has not intruded at that particular location and will not interfere with installation of the door edge guard. While it is possible for all locations along the length of the hem flange to be gauged, that is usually unnecessary. An installer familiar with the process can typically visually distinguish locations where sealant will not interfere with installation from locations where sealant may appear to interfere.

Figure 14:
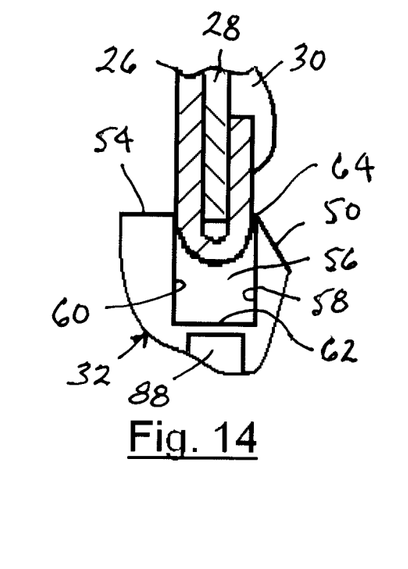
FIGS. 14 and 15 illustrate use of the tool to gauge the portion of the trailing edge of the door shown in FIG. 4.
Figure 15:
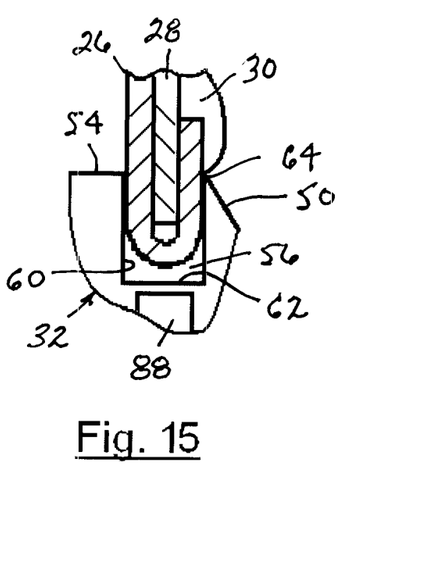
Figure 16:
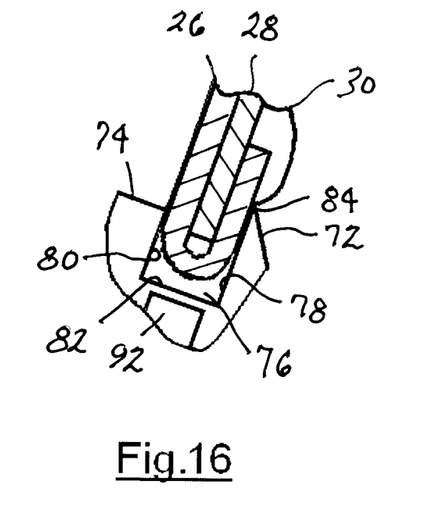
FIGS. 16 and 17 illustrate use of the tool to correct the portion of the trailing edge of the door shown in FIG. 4.
Figure 17:
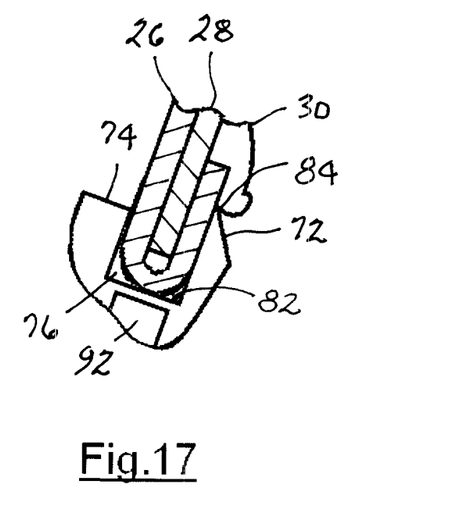

When the process is repeated at a different location, as shown in FIGS. 14 and 15, where the hem flange cannot be inserted to the full depth of slot 56 as shown in FIG. 15 because of sealant interference, that location may not allow the door edge guard to be installed on the hem flange without violating design intent. Tool 32 is then used to displace interfering sealant, as shown in FIGS. 16 and 17.

Slot 76 has a width between side surfaces 78 and 80 slightly greater than the thickness of the hem flange. Initially tool 32 is positioned by the installer to align the hem flange with slot 76. The tool is then advanced onto the hem flange as shown in FIG. 16. When edge 84 first contacts the interfering sealant, the hem flange has not yet bottomed out on bottom surface 82 as shown in FIG. 16. Continued advancement of the tool will cause edge 84 to displace interfering sealant out of the way until the hem flange bottoms out on bottom surface 82 as shown in FIG. 17, after which the tool is removed from the hem flange. The door edge guard can then be installed without sealant interference. Because depth of slot 76, unlike depth of slot 56, is at an acute angle to axis 38, an individual using correction tool 42 may have more of a tendency to force edge 84 against the hem flange as sealant is being displaced, and that makes displacement more effective.

Tool body 34 is fabricated from any suitably hard, non-scratching material, such as a synthetic material like high-density nylon, so that the tool body is dimensionally stable and damage-resistant, and edges 64 and 84 will not scratch paint which covers the hem flange. For example tool 32 can be fabricated from circular one-inch diameter high-density nylon bar stock cut to a length of about four inches, allowing the tool to be conveniently gripped and used. Nylon which has been removed from the bar stock creates side surfaces 46, 48, 68, and 70 and in the process reduces the lengths of slots 56 and 76 to less than one inch each, three-quarter inch being an example. These reductions in slot lengths facilitate use of the tool at locations where the hem flange has some degree of curvature. As aids to use of tool 32, decals are adhered to various surfaces of body 34.

Figures 5, 6, 7:
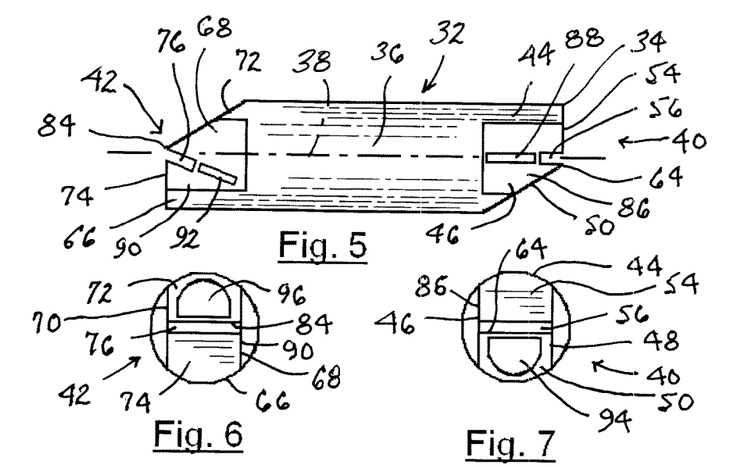
FIG. 5 is a side elevation view of an embodiment of the tool which is the subject of the present invention.
FIG. 6 is a left side view of FIG. 5.
FIG. 7 is a right side view of FIG. 5.
Figure 8:
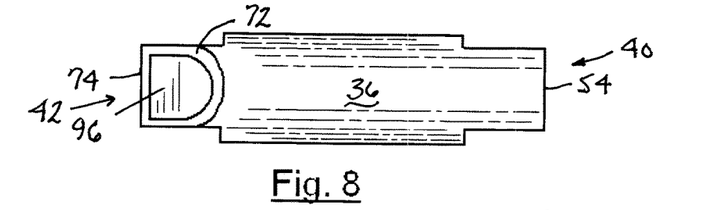
FIG. 8 is a top view of FIG. 5.
Figure 19:
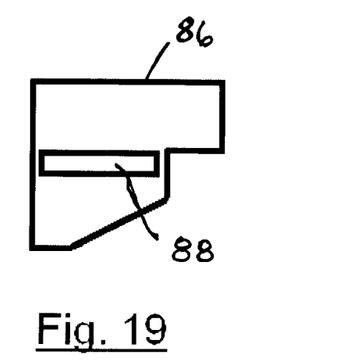
FIG. 19 is a plan view of another decal by itself before being applied to the tool.

A decal 86 shown by itself in FIG. 19 is adhered to surface 46 and contains a colored stripe 88 which aligns with slot 56. FIG. 5 is to be understood as showing decal 86 overlying surface 46. Decal 86 has a shape matching, but slightly smaller than, the shape of surface 46. A similar decal (not visible in the Figs.) is applied to surface 48 and also contains a stripe like stripe 88. The stripes aid the installer in aligning slot 56 with the hem flange.

Figure 18:
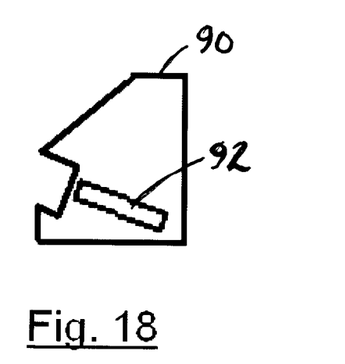
FIG. 18 is a plan view of a decal by itself before being applied to the tool.

A decal 90 shown by itself in FIG. 18 is adhered to surface 68 and contains a colored stripe 92 which aligns with slot 76. FIG. 5 is to be understood as showing decal 90 overlying surface 68. Decal 90 has a shape matching, but slightly smaller than, the shape of surface 68. A similar decal (not visible in the Figs.) is applied to surface 70 and also contains a stripe like stripe 92. The stripes aid the installer in aligning slot 76 with the hem flange.

The color of stripe 88 differs from that of stripe 92 to aid the installer in readily identifying the respective ends of tool 32. For example, stripe 88 may be green while stripe 92 is red.

A decal 94 (FIG. 7) is adhered to surface 50. It has the same color as stripe 88 and a shape matching, but slightly smaller than, the shape of surface 50. It also contains indicia which indicate that surface 50, and hence also groove surface 64, are to be placed on the sealant side of the hem flange when gauge 40 is to be used.

A decal 96 (FIG. 6) is adhered to surface 72. It has the same color as stripe 92 and a shape matching, but slightly smaller than, the shape of surface 72. It also contains indicia which indicate that surface 72, and hence also groove surface 78, are to be placed on the sealant side of the hem flange when correction tool 42 is to be used.

Figure 20:
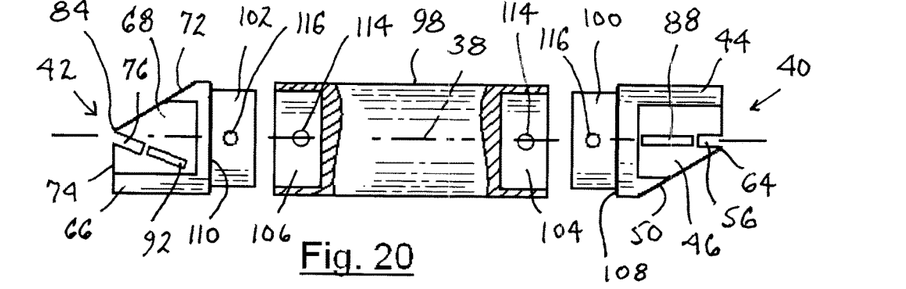
FIG. 20 is an exploded side elevation view, partly in cross section, of another embodiment of the tool.
Figure 21:
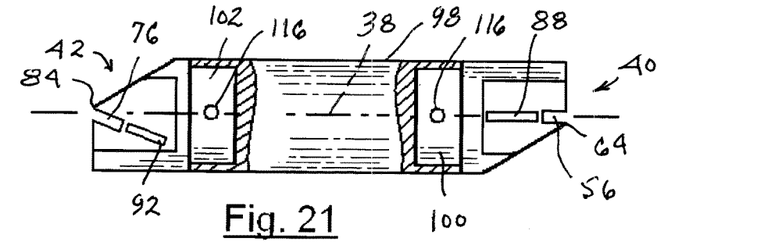
FIG. 21 is a non-exploded view of FIG. 20.
Figure 22:
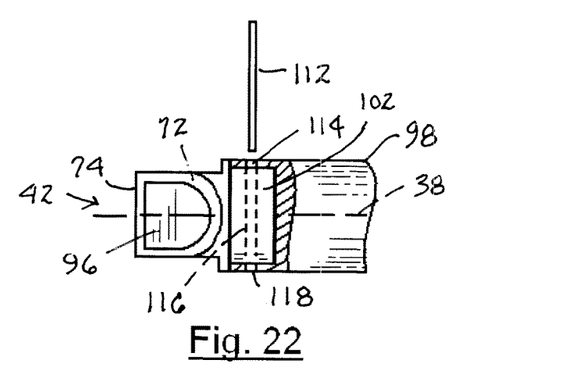
FIG. 22 is a view of a portion of the left of FIG. 21 rotated 90°.

FIGS. 20, 21, and 22 show another embodiment of tool 32 which comprises separable parts to allow gauge 40 and correction tool 42 to be individually separated from a cylindrical body 98. Gauge 40 and correction tool 42 each has the same construction as described above as evidenced by FIGS. 20, 21, 22 use of the same reference numerals as in earlier Figs. However, FIGS. 20-22 differ in that an end of gauge 40 opposite slot 56 and an end of correction tool 42 opposite slot 76 have reduced diameters which create respective plugs 100, 102 for plugging into respective open ends 104, 106 of body 98. When gauge 40 and correction tool 42 are plugged into body 98 as shown by FIG. 21, each plug 100, 102 has a secure fit to body 98 and a respective shoulder 108, 110 of each plug abuts a respective end of body 98. A secure fit of each plug to the body may be provided by a force fit which is not so tight as to prevent a plug from being pulled out of the body. A removable fastener 112 such as a pin, bolt, set screw or the like may be used to hold a plug in place. One example is suggested by FIG. 22 where each plug can be pinned to body 98 by inserting a fastener 112 into aligned holes 114, 116, 118. Another example (not illustrated) which doesn't use a separate fastener is a twist lock attachment of a plug to the body.

Making gauge 40 and correction tool 42 separable parts renders tool 32 more versatile and may be more cost effective. As separate parts, gauge 40 and correction tool 42 are still hard, non-scratching material which is dimensionally stable and damage-resistant, but now a less expensive material such as aluminum tubing can be used for body 98. The tool is now also adaptable to different hem flange thicknesses by simply exchanging gauge 40 and correction tool 42 for others which have different dimensions for slots 56 and 76.

From the foregoing description, it can be seen that: tool 32 comprises a body 34 having a lengthwise intermediate portion 36, a first lengthwise end portion 40 and a second lengthwise end portion 42 opposite first lengthwise end portion 40; first lengthwise end portion 40 comprises a first slot 56 for gauging clearance depth of an edge 22 of an object by insertion of edge 22 into first slot 56; first slot 56 comprises an open entrance and mutually confronting side surfaces 58, 60 lying in respective parallel planes and extending depthwise from the open entrance to a bottom surface 62; second lengthwise end portion 42 comprises a second slot 76 into which edge 22 is inserted to correct clearance depth of edge 22 after first slot 56 has disclosed insufficient clearance depth of edge 22 because of interfering material 30 on the edge; second slot 76 comprises an open entrance and mutually confronting side surfaces 78, 80 lying in respective planes which are non-parallel with the planes in which side surfaces 58, 60 of first slot 56 lie; side surfaces 78, 80 extend from the open entrance of second slot 76 to a bottom surface 82; between the open entrance of second slot 76 and bottom surface 82, one side surface 78 has a depth which is greater than depth of each side surface 58, 60 of first slot 56, the one side surface 78 comprising an edge 84 at the open entrance; and a surface 72 extending from edge 84 at an acute angle to side surface 78 cooperates with side surface 78 to form a wedge for correcting insufficient clearance depth of edge 22 by displacing interfering material 30 from edge 22 as edge 22 is being inserted into second slot 76 to the full depth of the slot. Edges at the open entrance of first slot 56 and surface 54, which extends at a right angle to side 60, lie in a common plane which is perpendicular to axis 38, and the edges at the open entrance of second slot 76 and surface 74 lie in a common plane which is perpendicular to axis 38. Each slot 56, 76 has a length which extends diametrically of axis 38 and is open at opposite ends of its length. The length of each slot is measured by an imaginary straight line extending diametrically of axis 38 thereby making the lengths of slots 56, 76 are parallel with each other.

The foregoing has also described a method for correcting insufficient clearance depth of a lengthwise extending edge of an object onto which an edge guard is to be installed. The method comprises using a tool with a first section to gauge clearance depth of the inserted edge, and using a second section of the tool to correct insufficient clearance depth which has been disclosed by use of the first section and using the second section to correct the edge by displacing interfering material on the edge so that sufficient clearance depth for properly installing an edge guard on the edge is achieved.

What is claimed is:

1. A tool comprising:
a body having a length ending at a first lengthwise end and at a second lengthwise end opposite the first lengthwise end;
a first portion of the body at the first lengthwise end comprising a first slot for gauging clearance depth of an edge of an object by insertion of the edge into the first slot, the first slot comprising an open entrance and mutually confronting side surfaces lying in respective parallel planes and extending depthwise of the first slot from the open entrance of the first slot to a bottom surface of the first slot;
a second portion of the body at the second lengthwise end comprising a second slot into which an edge of an object can be inserted to correct clearance depth of the edge alter the first slot has disclosed insufficient clearance depth of the edge for mounting an edge guard on the edge because of interfering material on the edge, the second slot comprising an open entrance and mutually confronting side surfaces lying in respective parallel planes and extending depthwise of the second slot from the open entrance of the second slot to a bottom surface of the second slot;
one side surface of the second slot having a depth, extending from the open entrance of the second slot to the bottom surface of the second slot, which is greater than depth of each side surface of the first slot, the one side surface of the second slot comprising an edge at the open entrance of the second slot; and
a surface extending from the edge of the one side surface of the second slot at an acute angle to the one side surface of the second slot and cooperating with the one side surface of the second slot to form a wedge for correcting insufficient clearance depth by displacing interfering material on the edge of the object when the edge of the object is inserted into the second slot so that sufficient clearance depth is achieved.

2. A tool as set forth in claim 1 in which the respective parallel planes in which the mutually confronting side surfaces of the second slot lie in respective planes which are non-parallel with the respective parallel planes in which the side surfaces of the first slot lie.

3. A tool as set forth in claim 2 in which one of the mutually confronting side surfaces of the first slot comprises an edge at the open entrance of the first slot, and a surface extends from the edge of the one of the mutually confronting side surfaces of the first slot at an acute angle to the one of the mutually confronting side surfaces of the first slot.

4. A tool as set forth in claim 3 in which the other of the mutually confronting side surfaces of the first slot comprises an edge at the open entrance of the first slot, and a surface extends from the edge of the other of the mutually confronting side surfaces of the first slot at a right angle to the other of the mutually confronting side surfaces of the first slot, and in which the other of the mutually confronting side surfaces of the second slot comprises an edge at the open entrance of the second slot, and a surface extends from the edge of the other of the mutually confronting side surfaces of the second slot at a right angle to the other of the mutually confronting side surfaces of the second slot.

5. A tool as set forth in claim 4 in which the body has a lengthwise intermediate portion disposed between the first and second portions of the body, and the lengthwise intermediate portion comprises a circular perimeter surface centered on an axis which extends lengthwise of the body.

6. A tool as set forth in claim 5 in which the edges at the open entrance of the first slot and the surface which extends at a right angle to the other of the mutually confronting side surfaces of the first slot lie in a common plane which is perpendicular to the axis, and the edges at the open entrance of the second slot and the surface which extends at a right angle to the other of the mutually confronting side surfaces of the second slot lie in a common plane which is perpendicular to the axis.

7. A tool as set forth in claim 2 in which the mutually confronting side surfaces of the first slot lie in respective planes which are parallel to a lengthwise extending axis of the body, and the mutually confronting side surfaces of the second slot lie in respective planes which are non-parallel to the axis.

8. A tool as set forth in claim 1 in which each slot has a length which extends diametrically of a lengthwise extending axis of the body and is open at opposite ends of its length.

9. A tool as set forth in claim 8 in which the lengths of the first slot and the second slot are parallel with each other.

10. A tool as set forth in claim 9, including a first stripe which is disposed on the body and has a length extending away from and in alignment with depth of the first slot, and a second stripe which is disposed on the body and has a length extending away from and in alignment with depth of the second slot, each stripe having a color different from that of the other stripe.

11. A tool as set forth in claim 1 in which between the first and second portions, the body comprises a lengthwise intermediate portion having a circular surface centered on a lengthwise extending axis of the body, the first portion of the body has a partially circular surface centered on the axis and parallel side surfaces which extend from circumferentially opposite ends of the partially circular surface and are spaced apart a distance less than a diameter of the circular surface, and the length of the first slot ends at the parallel side surfaces which extend from circumferentially opposite ends of the partially circular surface of the first portion of the body, and in which the second portion of the body has a partially circular surface centered on the axis and parallel side surfaces which extend from circumferentially opposite ends of the partially circular surface of the second portion of the body and are spaced apart a distance less than a diameter of the circular surface, and the length of the second slot ends at the parallel side surfaces which extend from circumferentially opposite ends of the partially circular surface of the second portion of the body.

12. A tool as set forth in claim 11 which the partially circular surfaces of the first and second portions of the body are continuations of diametrically opposite portions of the circular surface of the lengthwise intermediate portion of the body.

13. A tool as set forth in claim 1 in which the body comprises a dimensionally stable synthetic material.

14. A tool as set forth in claim 1 in which the first portion of the body and second portion of the body are in respective parts which are separable from a lengthwise intermediate portion of the body.

15. A tool as set forth in claim 2 in which each slot has a length which extends diametrically of a lengthwise extending axis of the body and is open at opposite ends of its length.

16. A tool as set forth in claim 15 which the lengths of the first slot and the second slot are parallel with each other.

17. A tool as set forth in claim 16 including a first stripe which is disposed on the body and has a length extending away from and in alignment with depth of the first slot, and a second stripe which is disposed on the body and has a length extending away from and in alignment with depth of the second slot.

18. A tool as set forth in claim 17 in which the first stripe has a color and the second stripe has a color different from that of the first stripe.

19. A tool as set forth in claim 18 in which each stripe is disposed on a decal adhered to the body.

20. A method for correcting insufficient clearance depth of a lengthwise extending edge of an object onto which an edge guard is to be installed, the method comprising: inserting the edge into a first slot of a clearance depth gauging tool to gauge sufficient clearance depth when the inserted edge bottoms out against a bottom surface of the first slot and to gauge insufficient clearance depth by failure of the inserted edge to bottom out against the bottom surface of the first slot, the first slot having side surfaces extending from the bottom surface along depth of the first slot; and when insufficient clearance depth has been disclosed by the inserted edge not bottoming out against the bottom surface of the first slot, correcting insufficient clearance depth by inserting the edge into a second slot of a clearance depth correction tool which has a bottom surface and side surfaces extending from the bottom surface of the second slot, one of which has depth greater than depth of both side surfaces of the first slot and which cooperates with another surface of the clearance depth correction tool to displace interfering material on the edge and create sufficient clearance death for properly installing an edge guard on the edge when the inserted edge bottoms out on the bottom surface of the second slot.

21. A method for correcting insufficient clearance depth of an edge of an object onto which an edge guard is to be installed, the method comprising:
- inserting the edge into a first slot of a clearance depth gauging tool to gauge sufficient clearance depth when the inserted edge bottoms out against a bottom surface of the first slot and to gauge insufficient clearance depth by failure of the inserted edge to bottom out against the bottom surface of the first slot; and
- when insufficient clearance depth has been disclosed by the first slot, correcting insufficient clearance depth by inserting the edge into a second slot of a clearance depth correction tool which has a wedge formed by a side surface of the second slot having depth greater than depth of the first slot and cooperating with another surface of the clearance depth correction tool to form a wedge having a sharp edge for displacing interfering material on the edge so that sufficient clearance depth for installing an edge guard on the edge is achieved.

* * * * *